United States Patent [19]

Crête et al.

[11] 4,272,385

[45] Jun. 9, 1981

[54] PERFUMED FIREPROOFING COMPOSITION

[76] Inventors: Micheline M. J. Crête; Pierre G. C. Crête, both of 14, rue de la Chataigneraie, Montmorency (Val d'Oise); Aurélie Pascod nee Pacescu, 107 Avenue de la Bourdonnais, Paris (Seine), all of France

[21] Appl. No.: 15,550

[22] Filed: Feb. 26, 1979

[30] Foreign Application Priority Data

Mar. 8, 1978 [FR] France ................................ 78 06704

[51] Int. Cl.³ .............................................. C09K 3/28
[52] U.S. Cl. ................................ 252/608; 106/18.11; 162/159; 252/522 R; 427/288; 427/421; 428/921
[58] Field of Search ..................... 106/18.11; 162/159; 252/8.1, 522; 428/289, 921

[56] References Cited

U.S. PATENT DOCUMENTS

| | | | |
|---|---|---|---|
| 2,771,379 | 11/1956 | Dario | 252/8.1 X |
| 3,804,759 | 4/1974 | Becker | 252/8 |

*Primary Examiner*—Leland A. Sebastian
*Attorney, Agent, or Firm*—Karl W. Flocks

[57] ABSTRACT

A perfumed fireproofing composition of the type including ammonium sulphamate as fireproofing agent and a wetting agent comprising, in an aqueous medium, a perfume based on terpene, phenyl or benzyl compounds, as well as an homogenizing agent for said perfume in the form of a sorbitan ester. The composition is intended for the fireproofing on the domestic scale of all fabrics and furnishing textiles while inhibiting the evil-smell of ammonium sulphamate.

8 Claims, No Drawings

PERFUMED FIREPROOFING COMPOSITION

BACKGROUND OF THE INVENTION

The present invention relates to a perfumed fireproofing composition, more especially for the fireproofing on the domestic scale of all fabrics and notably of drapes, curtains and other furnishing textiles.

At the present time, fireproofing products and compositions for textiles are known which are essentially applied at the step of manufacture or, in any case, at the level of industrial production. No composition usable on the domestic scale exists and it is, however, recognized to what point it is important for safety reasons to be able to fireproof textiles capable of causing fires as a result of accidents or of clumsiness.

The fireproofing compounds which are known and applied industrially are of the silicofluoride, phosphate, borate or sulphamate type, notably ammonium compounds. If their cost price or their ease of application do not come into consideration in a major way on the industrial scale, this is not the case on the domestic scale. In fact, among the most advantageous compounds for the latter application, ammonium sulphamate has the drawback of being evil-smelling either at the time of its use or after a certain time of aging when it releases, in particular, an odor of ammonia. Now all attempts directed to including perfume in such a composition have been unsuccessful due to the difficulty of obtaining a homogeneous medium wherein the components preserve their stability.

SUMMARY OF THE INVENTION

It is the object of this invention to overcome the various drawbacks mentioned above by providing an effective and cheap composition including a perfume whilst having good homogeneity and good stability.

The composition according to the invention of the type including ammonium sulphamate as fireproofing agent and a wetting agent is essentially characterized by the fact that it comprises in an aqueous medium a perfume based on terpene, phenyl or benzyl compounds as well as a homogenizing agent for said perfume in the form of a sorbitan ester.

Other characteristics and advantages of the present invention will emerge more clearly from the description which follows, given purely by way of explanation and not to be considered as limiting.

DESCRIPTION OF THE PREFERRED EMBODIMENTS

According to the invention, ammonium sulphamate and the other components of the composition are non-toxic. The wetting agent is intended, in the known manner, to enable the composition to wet the fibers and to penetrate into the textile structure. This wetting agent is advantageously constituted by an emulsion of a sulphonated fatty amino alcohol such as that available in the trade under the name "Rexamine".

As mentioned above, the homogenizing agent is of the sorbitan ester type, notably available in the trade under the name "Montanox 20" or "TW 20" in the form of a liquid polyethylene-sorbitan ester. This agent has the effect of maintaining the dispersion of the perfume within the aqueous medium without the possibility of separation by decantation.

The perfume is constituted by a mixture of terpene compounds such as citronnellol, geraniol, terpineol, geranium, santal, phenyl compounds such as phenylethyl alcohol and benzyl compounds such as benzyl acetate and salicylate. The amount of perfume used must be sufficient to mask the smell of the ammonium sulphamate and the amount of homogenizing agent is based on the amount of perfume.

There is also given below by way of non-limiting illustration, an example of an effective formulation of a fireproofing composition according to the invention. In this formulation, all the values are expressed in parts by weight:

| Water | 100 |
| --- | --- |
| Ammonium sulphamate | 30 |
| TW 20 | 2 |
| Rexamine | 5 |
| Perfume | 0.05 |

For the preparation of this composition, the various components may be introduced in the order indicated above.

The composition according to the invention is in the form of an aqueous medium which it is convenient to spray, by means of any suitable spray container, directly onto the textiles to be fireproofed. It is also desirable to carry out a spraying after each washing.

It will be understood that the present invention has been described only in a purely explanatory way and without any limitation and that any useful modification may be made thereto without thereby departing from its scope as defined in the appended claims.

What is claimed is:

1. Perfumed fireproofing composition including ammonium sulphamate as fireproofing agent and a wetting agent, comprising in an aqueous medium a perfume selected in the group consisting of terpene, phenyl and benzyl compounds as well as an homogenizing agent for said perfume in the form of a sorbitan ester.

2. Composition according to claim 1 wherein the wetting agent is a sulphonated fatty amino-alcohol emulsion.

3. Composition according to claim 1 wherein the perfume is constituted by a mixture of terpene, phenyl and benzyl compounds.

4. Composition according to claim 1 wherein the terpene compound is selected in the group consisting of citronnellol, geraniol, terpineol, geranium and santal.

5. Composition according to claim 1 wherein said phenyl compound is phenylethyl alcohol.

6. Composition according to claim 1 wherein said benzyl compound is benzyl acetate.

7. Composition according to claim 1 wherein said benzyl compound is benzyl salicylate.

8. Composition according to claim 1 having the following formula, in parts by weight:

| Water | 100 |
| --- | --- |
| Ammonium sulphamate | 30 |
| Wetting agent | 2 |
| Homogenizing agent | 5 |
| Perfume | 0.05 |